United States Patent Office 3,212,641
Patented Oct. 19, 1965

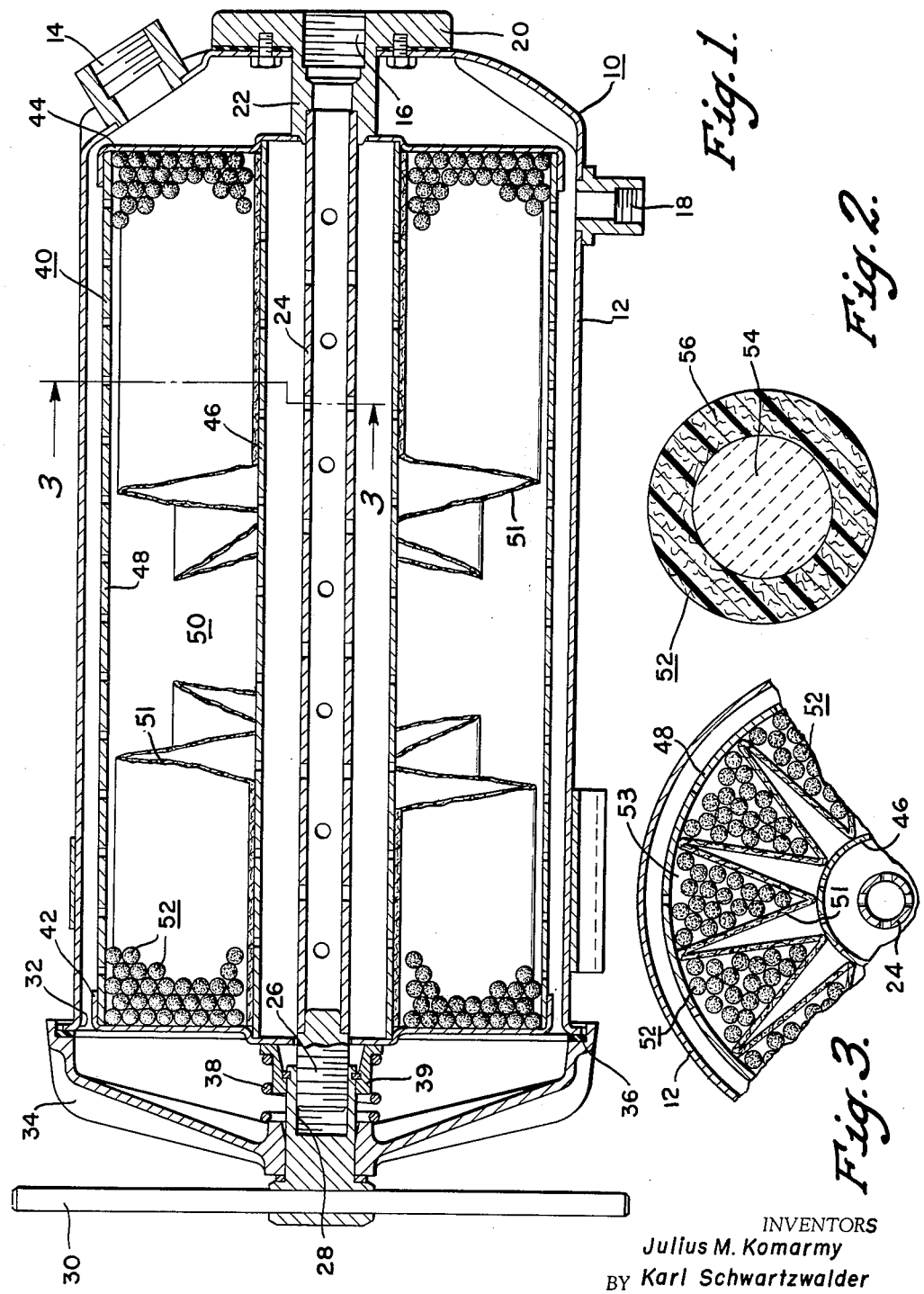

3,212,641
DRY CLEANING APPARATUS
Julius M. Komarmy, Flint, and Karl Schwartzwalder, Holly, Mich., assignors to General Motors Corporation, Detroit, Mich., a corporation of Delaware
Filed May 11, 1962, Ser. No. 194,127
8 Claims. (Cl. 210—266)

This invention relates to dry cleaning apparatus and more particularly to an improved filter medium for dry cleaning solvent.

In dry cleaning systems solvent is circulated between the cleaning area and a filter. The filter serves both to remove particulate matter from the circulating solvent and to condition the solvent by removing dyes therefrom, neutralizing the acids therein and/or supplementing the solvent with additives, such as detergents or antistats, etc., for use in the dry cleaning process. It is also desirable that solvent conditioning agents, such as activated charcoal, be retained within the filter and prevented from migrating to the cleaning area where they could spot the clothing being cleaned.

Accordingly, it is an object of this invention to provide an improved filter for dry cleaning solvent.

Another object of this invention is the provision of a filter medium comprised of a reactive inorganic material encased in fiber balls.

Further objects and advantages of the present invention will be apparent from the following description, reference being had to the accompanying drawings wherein a preferred embodiment of the present invention is clearly shown.

In the drawings:

FIGURE 1 is a side sectional view of a filter assembly adapted for use with dry cleaning apparatus;

FIGURE 2 is a cross sectional view of the improved filter medium of this invention; and FIGURE 3 is a fragmentary sectional view taken along line 3—3 in FIGURE 1.

In accordance with this invention and with reference to FIGURE 1, a filter assembly 10 is shown comprised of an imperforate casing or filter container 12, generally cylindrical in form, having a filter container inlet 14 and a filter container outlet 16. In addition to the inlet and outlet to the filter container, the filter may also be provided with a drain opening 18 adapted to return solvent to the sump of a dry cleaning apparatus when the apparatus is not in operation. The outlet opening 16 is formed in a container outlet fitting 20 which has a stub portion 22 extending into the casing for supporting thereon a perforated center support sleeve or outlet tube 24. The sleeve 24 has a threaded end piece or stud 26 for threadedly engaging a tapped latch collar, 28 in the lid lock handle 30. The container 12 is open at 32 and selectively closable by an imperforate lid or cover 34 which receives the edge of the container opening 32 in sealed relationship on its shoulder 36. A spring 38 is interposed between the cover 34 and a filter stop 39 to bias a replaceable filter cartridge 40 at its opposite ends into sealing engagement with the outlet fitting stub 22 and the filter stop 39. Thus, whenever the tapped latch collar 28 is placed in juxtaposition to the stud 26, the rotation of the handle 30 will attach the cover 34 in sealed relationship to the filter container 12. The foregoing filter assembly is suitable for use with the dry cleaning apparatus shown in the copending applications Ser. No. 105,733 filed April 26, 1961, now abandoned, and Ser. No. 120,420 filed June 28, 1961, now Patent Number 3,110,170, both applications being assigned to the same assignee as this invention.

Within the filter container 12, a replaceable filter cartridge is shown generally at 40. The cartridge 40 is comprised of a pair of center ported, circular metal end plates 42, 44 spaced apart by a perforated center or outlet sleeve 46 of metal, hardboard or other suitable material. The sleeve 46 forms, with a perforated outer wrapper or sleeve 48 of similar material, an annular or tubular filter medium chamber 50. This chamber 50 retains an annulus 51 of accordion pleated filter paper and the space or voids 53 between the outer wrapper 48 and the filter paper is filled with a plurality of filter balls 52 made in accordance with the teachings of this invention.

Turning now to FIGURE 2, the invention is illustrated as a filter medium or ball 52 having a reactive inorganic material 54 encased in a pervious fiber layer 56. The reactive inorganic material 54 may be activated alumina, activated carbon, activated magnesia, fuller's earth, a clay such as Georgia kaolin specifically treated for this purpose, and the like, or a combination thereof. The fibers 56 may be natural fibers, such as cotton or wool, or synthetics, such as rayon, Dacron, etc., or a combination thereof.

The preferred method for forming the filter medium balls 52 is to use a cylindrical container and first ball the inorganic material. Following this, fibers are allowed to build up on the inorganic balled element to form the layer 56. The surfaces of the resultant fiber coated ball are then coated with resin of the thermo-setting type. It is important that the resin should penetrate the fiber ball sufficiently to give strength but not enough to coat the activated particles in the center 54.

Such a filter medium is expected to have particular utility for the filtering of dry cleaning fluids which contain not only undissolved dirt and particulate matter but also dissolved contaminants such as dyes and acids. The undissolved contaminants will be picked up on the fibrous layer 56 whereas the dissolved contaminants can be adsorbed or neutralized by the activated core portion 54 of the filter medium.

After the balls 52 are formed, they are placed within a suitable container or support such as the filter cartridge 40 before the last end plate 42 is assembled to the cylinders 46 and 48. The inlet fitting 14 of the filter container 12 is adapted to receive contaminated solvent returning from the dry cleaning area whereas the filter container outlet 16 is connected to supply decontaminated solvent to the dry cleaning area. Any suitable pump means can be interposed in this fluid circuit for circulating the solvent between the filter 10 and the dry cleaning area. Solvent entering at 14 will enter the cartridge 40 through the perforations in the wrapper 48 and will proceed radially inwardly through and around the fiber coated balls 52, subsequently entering the outlet tube 24 leading to the filter container outlet 16.

It should now be seen that an improved solvent filter has been provided wherein fiber coated balls interposed in the path of circulating solvent perform the complete operation of removing particulate matter and dissolved contaminants from the solvent. Further, the novel fiber coated ball arrangement of this invention effectively prevents the migration of the inorganic centers of the balls from the filter cartridge into the circulating solvent.

While the embodiment of the present invention as herein disclosed constitutes a preferred form, it is to be understood that other forms might be adopted.

What is claimed is as follows:

1. In combination, a filter container having an inlet adapted to receive contaminated liquid solvent from a dry cleaning process and an outlet adapted to supply decontaminated solvent for said dry cleaning process, said container having an access opening and cover for selectively closing said access opening, a disposable filter cartridge insertible through said access opening into solvent flow interrupting relationship between said inlet and said outlet and comprising a pair of end plates in spaced parallel relationship, a center sleeve separating said end plates and having perforations in communication with said outlet, an outer sleeve concentric with said center sleeve and spaced therefrom to form a filter medium chamber and having perforations in communication with said inlet, filter paper means in said chamber having a plurality of pleats extending between said sleeves, and a plurality of reactive inorganic fiber coated balls in said chamber between said pleats and said outer sleeve, each of said balls having an inorganic center portion and a fibrous outer casing, said outer casing acting to remove particulate matter from solvent moving through said filter cartridge and said center portion acting to remove non-particulate matter from said solvent.

2. The combination of claim 1 wherein said center portion is comprised of material taken from the group consisting of activated alumina, activated carbon, activated magnesia, fuller's earth and clay.

3. The combination of claim 2 wherein said fibrous outer casing is comprised of fibers and a thermosetting resin partially penetrating said outer casing for holding the fibers together without coating said material in said center portion.

4. In combination, a filter container having an inlet adapted to receive contaminated liquid solvent from a dry cleaning process and an outlet adapted to supply decontaminated solvent for said dry cleaning process, said container having an access opening and cover for selectively closing said access opening, a disposable filter cartridge insertible through said access opening into solvent flow interrupting relationship between said inlet and said outlet and comprising a pair of end plates in spaced relationship, a center sleeve separating said end plates and having perforations in communication with said outlet, an outer sleeve surrounding said center sleeve and spaced therefrom to form a filter medium chamber and having perforations in communication with said inlet, filter paper means in said chamber in solvent flow interrupting relationship between said sleeves, and a plurality of reactive inorganic fiber coated balls in said chamber between said filter paper means and one of said sleeves, each of said balls having an inorganic center portion and a fibrous outer casing, said outer casing acting to remove particulate matter from solvent moving through said filter cartridge and said center portion acting to remove non-particulate matter from said solvent.

5. A disposable filter cartridge for liquid dry cleaning solvent comprising, a pair of end plates in spaced relationship, a pervious center sleeve separating said end plates, a perforated outer sleeve surrounding said center sleeve and spaced therefrom to form a filter medium chamber, filter paper means in said chamber in solvent flow interrupting relationship between said sleeves, and a plurality of reactive inorganic fiber coated balls in said chamber between said filter paper means and one of said sleeves, each of said balls having an inorganic center portion and a fibrous outer casing, said outer casing acting to remove particulate matter from solvent moving through said filter cartridge and said center portion acting to remove non-particulate matter from said solvent.

6. The filter cartridge of claim 5 wherein said center portion is comprised of material taken from the group consisting of activated alumina, activated carbon, activated magnesia, fuller's earth and clay.

7. The filter cartridge of claim 6 wherein said fibrous outer casing is comprising of fibers and a thermosetting resin partially penetrating said outer casing for holding the fibers together without coating said material in said center portion.

8. A disposable filter cartridge for liquid dry cleaning solvent comprising, a pair of end plates in spaced parallel relationship, a perforated center sleeve separating said end plates, a perforated outer sleeve concentric with said center sleeve and spaced therefrom to form a filter medium chamber, and a plurality of reactive inorganic fiber coated balls in said chamber, each of said balls having an inorganic center portion and a fibrous outer casing, said outer casing being impregnated with a thermosetting resin binder and acting to remove particulate matter from solvent moving through said filter cartridge and said center portion acting to remove non-particulate matter from said solvent.

References Cited by the Examiner

UNITED STATES PATENTS

| | | | |
|---|---|---|---|
| 2,079,910 | 5/37 | Kamrath | 210—509 X |
| 2,116,537 | 5/38 | Miller | 210—505 |
| 2,423,702 | 7/47 | Hart | 210—510 X |
| 2,568,144 | 9/51 | Cremer et al. | 210—502 X |
| 2,796,989 | 6/57 | Kovacs | 210—502 X |
| 2,850,168 | 9/58 | Norstrand | 210—295 |
| 3,003,643 | 10/61 | Thomas | 210—295 X |
| 3,019,127 | 1/62 | Czerwonka et al. | |
| 3,090,490 | 5/63 | Yocum. | |

REUBEN FRIEDMAN, *Primary Examiner.*

HERBERT L. MARTIN, *Examiner.*